United States Patent
Kubo et al.

(10) Patent No.: US 8,463,302 B2
(45) Date of Patent: Jun. 11, 2013

(54) PAGING-AREA DETERMINATION METHOD AND CALL-PROCESSING CONTROL APPARATUS IN MOBILE COMMUNICATION SYSTEM

(75) Inventors: Shigeyasu Kubo, Chigasaki (JP); Yosuke Takahashi, Kawasaki (JP); Akihiko Yoshida, Yokohama (JP); Daigo Takayanagi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 12/825,823

(22) Filed: Jun. 29, 2010

(65) Prior Publication Data

US 2011/0053591 A1 Mar. 3, 2011

(30) Foreign Application Priority Data

Aug. 25, 2009 (JP) .................................. 2009-193783

(51) Int. Cl.
*H04W 68/00* (2009.01)

(52) U.S. Cl.
USPC ..................... 455/458; 455/435.1; 455/435.2; 455/456.1

(58) Field of Classification Search
USPC ................ 455/458, 435.2, 445, 456.1, 435.1, 455/432.1
See application file for complete search history.

(56) References Cited

U.S. PATENT DOCUMENTS

| | | | | |
|---|---|---|---|---|
| 5,289,527 | A * | 2/1994 | Tiedemann, Jr. ........... | 455/435.1 |
| 5,642,398 | A * | 6/1997 | Tiedemann et al. ....... | 455/426.1 |
| 2001/0309419 | | 10/2001 | Kuwahara | |
| 2007/0104156 | A1 * | 5/2007 | Inoue et al. .................... | 370/338 |
| 2009/0213762 | A1 * | 8/2009 | Guo et al. ..................... | 370/254 |
| 2009/0291694 | A1 * | 11/2009 | Yano et al. ................. | 455/456.5 |
| 2010/0279696 | A1 * | 11/2010 | Voyer et al. ................... | 455/440 |

FOREIGN PATENT DOCUMENTS

| | | |
|---|---|---|
| JP | 2001-309419 | 11/2001 |
| JP | 2006-246006 | 9/2006 |
| JP | 2008-182507 | 8/2008 |

OTHER PUBLICATIONS

Mitsubishi Electric, "Reported List of Last Visited Tracking Areas", 3GPP TSG RAN WG3 Meeting #56, May 7-11, 2007.*
$3^{rd}$ Generation Partnership Project; Technical Specification Group Core Network and Terminals; Non-Access-Stratum (NAS) protocol for Evolved Packet System (DPS); Stage 3, 3 GPP TS 24.301 V1.0.0 (Sep. 2008).
$3^{rd}$ Generation Partnership Project; Technical Specification Group Services and System Aspects; General Packet Radio Access Service (GPRS) enhancements for Evolved Universal Terrestrial Radio Access Network (E-UTRAN) access, Global system for Mobile Communications, 3GPP TS 23401 V8.3.0 (Sep. 2008).

* cited by examiner

*Primary Examiner* — Allahyar Kasraian
(74) *Attorney, Agent, or Firm* — Antonelli, Terry, Stout & Kraus, LLP.

(57) ABSTRACT

In order to narrow down base stations within the tracking-area-based paging area to ones within a smaller area where the mobile unit may exist in a mobile communication system performing the paging on the tracking-area basis, the mobile communication system has a location registration information database memorizing tracking area information, a last location registration information and a N-th (N is an integer of one or more) location registration information from the last for each mobile unit, calculates statistical data on a movement distance for each mobile unit based on the location registration information memorized in the location registration information database, and performs the paging via base stations included both within an area whose radius is equal to the calculated statistical data on the movement distance and within the tracking area.

3 Claims, 9 Drawing Sheets

PAGING-AREA DETERMINATION METHOD AND CALL-PROCESSING CONTROL APPARATUS IN MOBILE COMMUNICATION SYSTEM

INCORPORATION BY REFERENCE

The present application claims priority from Japanese application JP2009-193783 filed on Aug. 25, 2009, the content of which is hereby incorporated by reference into this application.

BACKGROUND OF THE INVENTION

The present invention relates to a mobile communication system. Particularly, it relates to a paging technology for calling a mobile unit within the mobile communication system.

As the requirements requested for a mobile unit in the mobile communication system, a significant importance is placed on a longer operating life of its battery in addition to the excellence in its design and operability. Therefore, it is a problem how the communication mechanism should be constructed in order to suppress the battery consumption. For example, in the present mobile communication system, the battery consumption is suppressed as follows: in the case of no data communications with a base station, the mobile unit moves in a mode where the mobile unit receives only the notification information from the base station without two-way communication (standby mode).

In the case where incoming data has occurred for a mobile unit in the standby mode, the mobile communication system cannot recognize where the mobile unit exists. Accordingly, it is required to transmit the incoming signal to the mobile unit from a plurality of base stations within whose cells the mobile unit may exist. Transmitting incoming signals to a mobile unit from a number of base stations in this way, however, results in a waste of the wireless resources. The 3GPP (3rd generation partnerships) 3GPP TS 24. 301 V8. 0. 05. 6. 2 Paging Procedure, and the 3GPP (3rd generation partnerships) 3GPP TS 23. 401 V8. 4. 05. 3. 4. 3 Network Triggered Service Request indicate a location registration technology for narrowing down base stations within whose cells the mobile unit may exist to ones within a certain area in order to suppress the waste of the wireless resources due to the incoming signals. The 3GPP TS 24. 301 V8. 0. 05. 6. 2 Paging Procedure, and the 3GPP TS 23. 401 V8. 4. 05. 3. 4. 3 Network Triggered Service Request are the standard documents that describe technical specifications in the LTE (Long Term Evolution) system, i.e., 3.9 G next-generation wireless communications technology.

The 3GPP TS 24. 301 V8. 0. 05. 6. 2 Paging Procedure, and the 3GPP TS 23. 401 V8. 4. 05. 3. 4. 3 Network Triggered Service Request describe the location registration scheme that uses a tracking area (TA) covered by a group of base stations. A call-processing control apparatus identifies the TA using an area identifier of TAI (Tracking Area Identity). The TAI is allocated to every base station or cell, and one and the same value of the TAI can be assigned to a plurality of base stations or cells. The tracking area within which the mobile unit exists is managed using the TAI.

In the case where a mobile unit is managed within a tracking area, the mobile unit is not required to perform the location registration as long as the mobile unit exists within the tracking area, and thus performs no location registration. In the case where the mobile unit has moved between the tracking areas, the mobile unit performs the location registration. When the mobile unit is managed within a tracking area, an area (hereinafter referred to as a "paging area") where paging messages for incoming data should be transmitted is only the tracking area. As a result, it becomes possible to suppress the consumption of the wireless resources used to transmit paging messages for incoming data. As described above, however, the mobile unit is required to perform the location registration processing every time the mobile unit moves into another different tracking area, and thus the consumption of the wireless resources increases due to the location registration processing. As a scheme for suppressing the increase in the consumption of the wireless resources due to the location registration processing, the 3GPP TS 24. 301 V8. 0. 05. 6. 2 Paging Procedure and the 3GPP TS 23. 401 V8. 4. 05. 3. 4. 3 Network Triggered Service Request describe a method of managing mobile units using a tracking-area-identity list (TAI list) including a plurality of TAIs.

The use of the TAI list including the plurality of TAIs makes it unnecessary for the mobile unit to perform the location registration processing as long as the mobile unit moves within an area (hereinafter referred to as "tracking-area-based paging area") including tracking areas that correspond to the plurality of TAIs in the TAI list. At this time, in the case where the mobile unit has been belonging to the tracking-area-based paging area and has been performing no communications for a long time, the call-processing control apparatus cannot judge whether the mobile unit is in the standby mode, or in a mode where the mobile unit cannot communicate with the base stations (for example, where the mobile unit enters a tunnel or underground, and thus cannot receive even the notification information from the base stations; and where the mobile unit turns off the power-supply in the above-described mode, and thus cannot communicate with the base stations without even notifying the base stations and the call-processing control apparatus that the mobile unit has turn off the power-supply). If the mobile unit is in the mode where the mobile unit cannot communicate with the base stations, the call-processing control apparatus executes a processing of deleting the call information for the mobile unit in order to make an effective use of its own memory capacity. Meanwhile, if the mobile unit is in the standby mode, the mobile unit may communicate with the base stations later, and thus the call-processing control apparatus does not delete the call information for the mobile unit. The mobile unit performs the location registration processing periodically in order to allow the call-processing control apparatus to check the mode of the mobile unit. The mobile unit has a periodic timer for performing the location registration periodically. The mobile unit performs the location registration processing when the timer expires, and the timer restarts after the location registration processing is over. As long as the mobile unit executes the location registration using the periodic timer (hereinafter referred to as "periodic timer location registration"), the call-processing control apparatus judges that the mobile unit is in the standby mode. Otherwise, the apparatus judges that the mobile unit is in the call disconnecting mode.

When receiving notification of incoming data for the mobile unit in the standby mode from a gateway, the call-processing control apparatus starts a processing of notifying the mobile unit of receiving incoming data. The notification of incoming data is sent to all of the base stations within the tracking-area-based paging area.

In addition to the above-described documents, there exists JP-A-2008-182507, which discloses a technology for reducing the consumed power in a terminal connectable to both of a broadband wireless communication network and a wireless LAN. The technology is as follows: a connection-information providing apparatus connected to the terminal via the broadband wireless communication network or the wireless LAN stores, in advance, connection information indicating an access point of the wireless LAN together with location information, to provide the terminal with the connection information corresponding to the location of the terminal. Finally, the terminal determines an operation period based on the location of the terminal itself and the provided connection information, and then performs an operation to detect the access point of the wireless LAN.

SUMMARY OF THE INVENTION

If, as described earlier, the call-processing control apparatus performs the paging via all of the base stations within the tracking-area-based paging area, the call-processing control apparatus fails to perform the paging except for the base station within whose cell the mobile unit exists. As a result, it turns out that the wireless resources used for the failed paging are consumed in vain. In order to suppress the vain consumption of the wireless resources like this, the call-processing control apparatus is required to further narrow down base stations within the tracking-area-based paging area to ones within a paging area where the mobile unit may exist. Then, the call-processing control apparatus performs the paging via the base stations within the narrowed-down paging area where the mobile unit may exist. This method makes it possible to save the wireless resources as compared with the method described earlier where the call-processing control apparatus performs the paging via all of the base stations within the tracking-area-based paging area.

The present invention has been devised in order to solve the following problem: the paging via all of the base stations within the tracking-area-based paging area gives rise to a large consumption amount of the wireless resources. Accordingly, an object of the present invention is to provide a method of allowing the call-processing control apparatus to narrow down base stations within the tracking-area-based paging area to ones within a smaller area where the mobile unit may exist.

In order to solve the above-described problem, in the present invention, a mobile communication system where the paging is performed on a tracking-area basis has a location registration information database memorizing tracking area information, a last location registration information and a N-th (N is an integer of one or more) location registration information from the last for each mobile unit, calculates statistical data on a movement distance for each mobile unit based on the location registration information memorized in the location registration information database, and performs the paging via base stations included both within an area whose radius is equal to the calculated statistical data on the movement distance and within the tracking area.

Also, the mobile communication system calculates plural values of the statistical data on the movement distance based on a preset method, pages each mobile unit via base stations both within an area whose radius is equal to a smallest value of the statistical data and within the tracking area, and, in case of failing in the paging, enlarges the paging area in a step-by-step manner by similarly performing the paging within an area whose radius is equal to the next value among plural values of the statistical data in ascending order.

Also, in more detail, the mobile communication system calculates an inter-base-stations distance X which each mobile unit moved between the last location registration and the N-th location registration from the last, and a probability density function f (x) of the inter-base-stations distance X, and by setting the plural threshold values for the cumulative probability of the probability density function f (x), calculates the plural values of the statistical data.

The present invention can narrow down base stations within the tracking-area-based paging area to ones within an smaller area where a mobile unit may exist to solve the problem of a large consumption amount of the wireless resources, or the serious drawback in the tracking-area-based paging.

Other objects, features and advantages of the invention will become apparent from the following description of the embodiments of the invention taken in conjunction with the accompanying drawings.

DESCRIPTION OF THE INVENTION

The explanation will be given below concerning embodiments of the present invention.

First, the present invention will be outlined below. The call-processing control apparatus memorizes the latitudes/longitudes of base stations in advance. When receiving a location registration message via the base stations from a mobile unit which has performed a periodic-timer location registration, the call-processing control apparatus calculates an inter-base-stations distance between the last base station and the N-th (N is an integer of one or more) from the last among ones which received the location registration message. In the below explanation, N will be referred to as the "number of periodic-timer location registration".

Every time a mobile unit performs the periodic-timer location registration, the call-processing control apparatus accumulates the calculation result data of the inter-base-stations distance into its own database as statistical data. Then, the call-processing control apparatus predicts the distance which the mobile unit moves until the mobile unit performs the periodic-timer location registration next time. The distance predicted by the call-processing control apparatus from the statistical data on the inter-base-stations distance is used for constructing a circular distance-based paging area whose center is the last base station which received the location registration message.

When paging the mobile unit, the call-processing control apparatus determines that a first paging area is an area where a tracking-area-based paging area and the distance-based paging area overlap with each other. The call-processing control apparatus, first, performs the paging within the first paging area, and then, only in the case of failing in the paging within the first paging area, the paging is performed within the tracking-area-based paging area.

In the case where the call-processing control apparatus allows the step-by-step paging up to K times and there are M candidates for the distance-based paging area within which the mobile unit may exist, the call-processing control apparatus performs the paging up to M (M is less than or equal to K) times in ascending order of the radiuses of the distance-based paging areas, and then, only in the case of failing in all of the paging within the first paging area, the second paging area, . . . , and the M-th paging area, the call-processing control apparatus performs the paging within the tracking-area-based paging area.

In the present embodiment, the explanation will be given under a condition that the allowance number K for the step-by-step paging is set at 1, and that the number of periodic-timer location registration N for calculating the inter-base-stations distance is set at 2.

Figure 1:
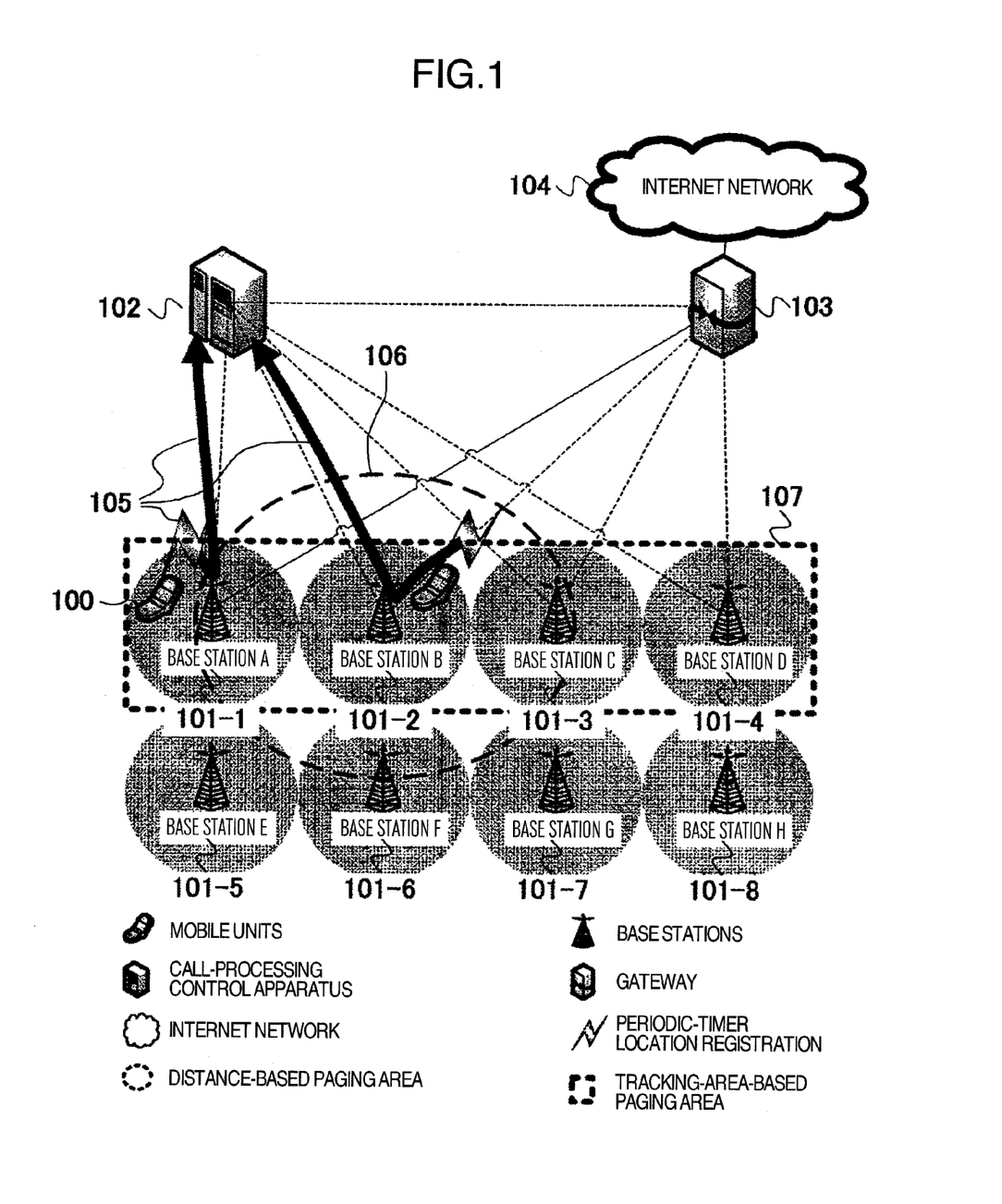
FIG. 1 shows a configuration example of the mobile communication system to which the present invention is applied.

FIG. 1 shows a configuration example of the mobile communication system to which the present invention is applied.

The mobile communication system comprises mobile units 100, base stations 101-1, 101-2, 101-3, and 101-4, a call-processing control apparatus 102, a gateway 103, and an Internet network 104. The mobile units 100 and the base stations 101 communicate with each other via wireless communication lines. The base stations 101, the call-processing control apparatus 102, and the gateway 103 are connected to each other via a mesh-like wired communication lines. The gateway 103 is connected to the Internet network 104. The mobile units 100 transmit/receive the data to/from a server in the Internet network 104 via the base stations 101 and the gateway 103.

A mobile unit 100 and the call-processing control apparatus 102 carry out a periodic-timer location registration 105 via the base stations 101. For example, in the case where the mobile unit 100 carries out the periodic-timer location registration 105 via the base station A 101-1, the mobile unit 100 transmits a location registration message to the base station A 101-1 via the wireless communication lines. Then, the base station A 101-1 transfers, to the call-processing control apparatus 102, the location registration message received from the mobile unit 100. When receiving the location registration message, the call-processing control apparatus 102 recognizes that the mobile unit 100 exists within the cell under control of the base station A 101-1.

The mobile unit 100 carries out the location registration processing periodically using its own periodic timer. The call-processing control apparatus 102 calculates an inter-base-stations distance between the last base station 101 and second base station 101 from the last among ones which received the periodic-timer location registration message from the mobile unit. In the present embodiment, the call-processing control apparatus 102 calculates the inter-base-stations distance from the last base station B 101-2 to the second base station A 101-1 from the last among ones which received the periodic-timer location registration message from the mobile unit. Every time the mobile unit 100 performs the periodic-timer location registration 105, the call-processing control apparatus 102 accumulates the calculation result data on the inter-base-stations distance in its own database. Then, the call-processing control apparatus 102 predicts the distance which the mobile unit 100 moves until the mobile unit 100 performs the periodic-timer location registration 105 next time. Concerning a concrete example of the statistical processing, the explanation will be given later using FIG. 6A and FIG. 6B. The distance predicted by the call-processing control apparatus 102 based on the statistical data on the inter-base-stations distance is used for constructing a circular distance-based paging area 106 whose center is the last base station B 101-2 which received the periodic-timer location registration message. In FIG. 1, the call-processing control apparatus 102 determines that the base stations 101 within the distance-based paging area 106 are the base station A 101-1, B 101-2, and C 101-3. Meanwhile, the call-processing control apparatus 102 has determined that the base stations 101 within the tracking-area-based paging area 107 were the base stations A 101-1, B 101-2, C 101-3, and D 101-4, and thus the call-processing control apparatus 102 determines that base stations within the first paging area are the base stations A 101-1, B 101-2, and C 101-3.

Figure 2:
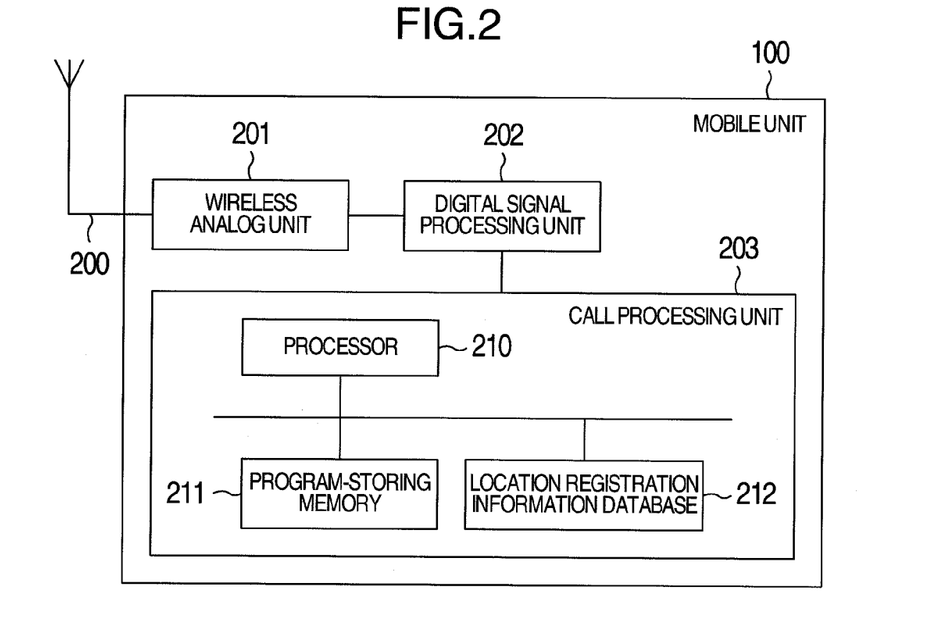
FIG. 2 is a block diagram for illustrating the configuration of a mobile unit 100 in an embodiment of the present invention.

FIG. 2 is a block diagram for illustrating the configuration of the mobile unit 100 in an embodiment of the present invention.

The mobile unit 100 comprises one or plural numbers of transmission/reception antennas 200, a wireless analog unit 201 connected to each transmission/reception antenna 200, a digital signal processing unit 202 connected to the wireless analog unit 201, and a call processing unit 203 connected to the digital signal processing unit 202.

Here, the wireless analog unit 201 converts an analog signal received from the base station 101 via the antenna 200 into a digital signal, to output the digital signal to the digital signal processing unit 202. Also, the wireless analog unit 201 converts a digital signal received from the digital signal processing unit 202 into an analog signal, to transmit the analog signal to the base station 101 via the antenna 200. The digital signal processing unit 202 demodulates the signal from the wireless analog unit 201 and modulates the signal to the base station 101. The call processing unit 203 comprises a processor (control unit) 210, a memory 211 for storing programs executed by the processor 210 etc., and a location registration information database 212 for memorizing a TAI list transmitted from the call-processing control apparatus 102 and a periodic-timer value for performing the periodic-timer location registration 105.

The mobile unit 100 has at least a function of performing the periodic-timer location registration 105 when the periodic-timer value expires to transmit the periodic-timer location registration message to the base station 101, a function of transitioning from the standby mode to the communication mode to perform the periodic-timer location registration 105, and a function of restarting the periodic timer when the mobile unit 100 transitions from the communication mode to the standby mode after the processing of the periodic-timer location registration 105 is over.

Figure 3:
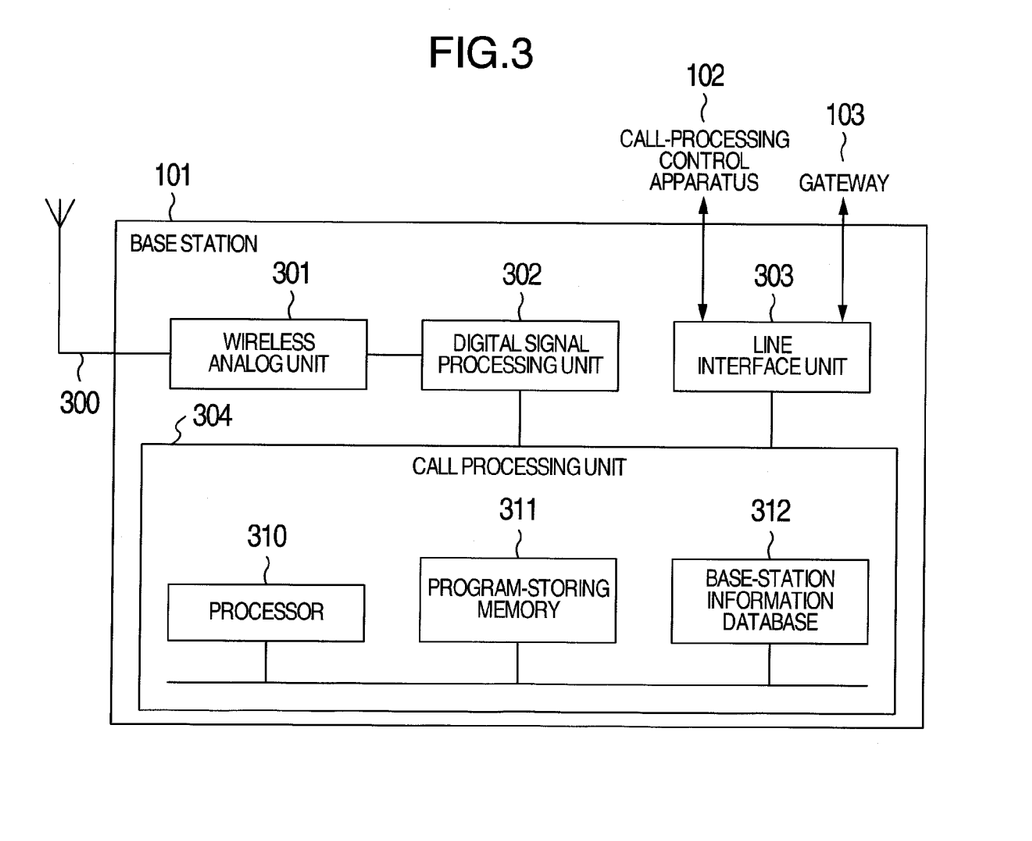
FIG. 3 is a block diagram for illustrating the configuration of a base station 101 in an embodiment of the present invention.

FIG. 3 is a block diagram for illustrating the configuration of the base station 101 in an embodiment of the present invention.

The base station 101 comprises transmission/reception antennas 300, a wireless analog unit 301 connected to each transmission/reception antenna 300, a digital signal processing unit 302 connected to the wireless analog unit 301, a call processing unit 304 connected to the digital signal processing unit 302, and a line interface unit 303 connected to the call processing unit 304. The line interface unit 303 is also connected to the call-processing control apparatus 102 and the gateway 103 via the wired communications lines.

Here, the wireless analog unit 301 converts an analog signal received from the mobile unit 100 via the antenna 300 into a digital signal, to output the digital signal to the digital signal processing unit 302. Also, the wireless analog unit 301 converts a digital signal received from the digital signal processing unit 302 into an analog signal, to transmit the analog signal to the mobile unit 100 via the antenna 300. The digital signal processing unit 302 demodulates the signal from the wireless analog unit 301 and modulates the signal to the mobile unit 100. The call processing unit 304 comprises a processor (control unit) 310, a memory 311 for storing programs executed by the processor 310 etc., and a base-station information database 312 for storing the latitude/longitude at which the base station 101 is installed, a base station identifier, and a tracking area identifier.

The base station 101 has at least a function of transmitting its own latitude/longitude, the base station identifier, and the tracking area identifier to the call-processing control apparatus 102, a function of transmitting the location registration message transmitted from the mobile unit 100 to the call-processing control apparatus 102, a function of transmitting a response to the location registration message transmitted from the call-processing control apparatus 102 to the mobile unit 100, and a function of transmitting a paging message to the mobile unit 100 on the basis of a paging request from the call-processing control apparatus 102.

Figure 4:
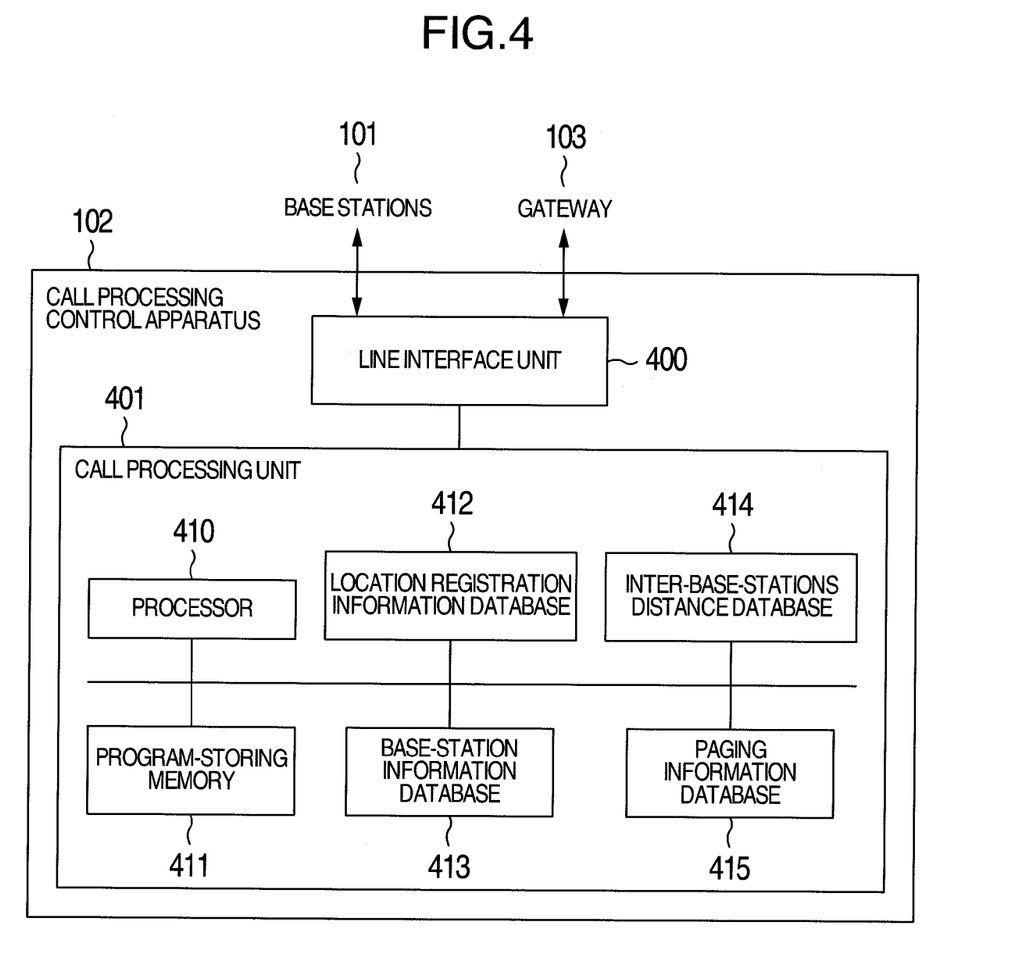
FIG. 4 is a block diagram for illustrating the configuration of a call-processing control apparatus 102 in an embodiment of the present invention.

FIG. 4 is a block diagram for illustrating the configuration of a call-processing control apparatus 102 in an embodiment of the present invention.

The call-processing control apparatus 102 comprises a line interface unit 400 connected to the base stations 101 and the gateway 103, and a call processing unit 401 connected to the line interface unit 400.

Here, the call processing unit 401 comprises a processor (control unit) 410, a memory 411 for storing programs executed by the processor 410 etc., a location registration information database 412 for storing, for each mobile unit 100, the TAI list together with the base station identifiers of the last base station and the second base station from the last among ones to which each mobile unit 100 performed the location registration, a base-station information database 413 for storing the latitude/longitude, the IP address and the tracking area identifier transmitted by the base station 101, an inter-base-stations distance database 414 for storing, as statistical data, plural inter-base-stations distances between the last base station 101 and the N-th base stations 101 from the last among ones which received the location registration message, and a paging information database 415 for storing the allowance number K for the step-by-step paging and the number of periodic-timer location registration N for calculating the inter-base-stations distance. The database configuration shown in FIG. 4 is an example, and thus some of these databases may also be configured so as to be integrated in a database.

The call-processing control apparatus 102 has a function of processing the statistical data of the inter-base-stations distance stored in the inter-base-stations distance database 414, a function of returning the response message to the location registration message transmitted by the mobile unit 100, a function of memorizing, in the location registration information database 412, the base station identifier of the last base station among ones to which the mobile unit 100 performed the location registration, a function of memorizing, in the location registration information database 412, the base station identifier of the second base station from the last among ones to which the mobile unit 100 performed the location registration, a function of requesting the base stations 101 within the first paging area to perform the paging when receiving incoming data for the mobile unit, and a function of requesting the base stations 101 within the tracking-area-based paging area to perform the paging in the case of failing in the paging within the first paging area.

Next, the explanation will be given concerning steps of determining the paging area.

Figure 5:
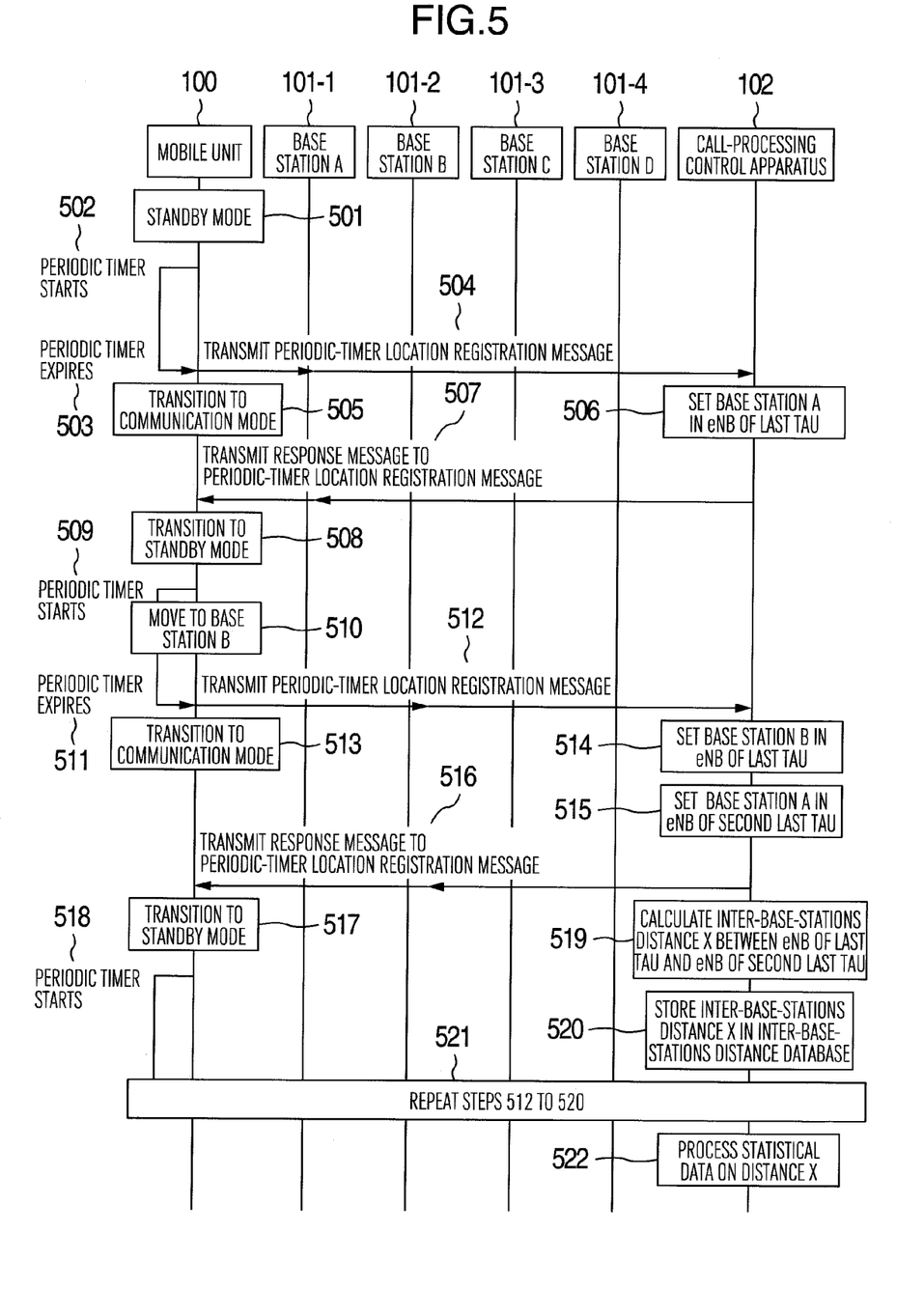
FIG. 5 is a sequence diagram for illustrating steps in accordance with which the call-processing control apparatus 102 determines the paging area in the mobile communication system.

FIG. 5 is a sequence diagram for illustrating the processing in accordance with which the call-processing control apparatus 102 determines the first paging area in response to the periodic-timer location registration performed by the mobile unit 100 in the mobile communication system.

As an initial state before performing the periodic-timer location registration 105 in the sequence diagram illustrated in FIG. 5, Table 1 shows an example of the location registration information database 212 of the mobile unit 100, Tables 2 to 9 shows an example of the base-station information databases 312 of the base stations A 101-1, B 101-2, C 101-3, D 101-4, E 101-5, F 101-6, G 101-7, and H 101-8, respectively, and Tables 10 to 12 shows an example of the location registration information database 412, the base-station information database 413, and the paging information database 415 of the call-processing control apparatus 102, respectively.

TABLE 1

| LOCATION REGISTRATION INFORMATION DATABASE OF MOBILE UNIT | |
|---|---|
| TAI LIST | TAI 1, TAI 2 |
| PERIODIC-TIMER VALUE | ONE HOUR |

Table 1 shows an example of the location registration information database 212 of the mobile unit 100.

The location registration information database 212 stores the TAI list: TAI 1 and TAI 2, and the periodic-timer value: one hour. When the mobile unit 100 exists within the cells under control of the base stations within the TAI 1 and TAI 2 areas, the mobile unit 100 performs the periodic-timer location registration 105 only when the periodic timer expires.

TABLE 2

| BASE-STATION INFORMATION DATABASE OF BASE STATION A | |
|---|---|
| LATITUDE/LONGITUDE | LATITUDE: 35.40, LONGITUDE: 139.53 |
| BASE STATION IDENTIFIER | GLOBAL eNB ID A |
| TRACKING AREA IDENTIFIER | TAI 1 |

Table 2 shows an example of the base-station information database 312 of the base station A 101-1.

The base-station information database 312 of the base station A 101-1 stores the latitude/longitude: 35. 40/139. 53, the base station identifier: Global eNB ID A, and the tracking area identifier: TAI 1.

TABLE 3

BASE-STATION INFORMATION DATABASE OF BASE STATION B

| | |
|---|---|
| LATITUDE/LONGITUDE | LATITUDE: 35.40, LONGITUDE: 139.55 |
| BASE STATION IDENTIFIER | GLOBAL eNB ID B |
| TRACKING AREA IDENTIFIER | TAI 1 |

Table 3 shows an example of the base-station information database 312 of the base station B 101-2.

The base-station information database 312 of the base station B 101-2 stores the latitude/longitude: 35. 40/139. 55, the base station identifier: Global eNB ID B, and the tracking area identifier: TAI 1.

TABLE 4

BASE-STATION INFORMATION DATABASE OF BASE STATION C

| | |
|---|---|
| LATITUDE/LONGITUDE | LATITUDE: 35.40, LONGITUDE: 139.57 |
| BASE STATION IDENTIFIER | GLOBAL eNB ID C |
| TRACKING AREA IDENTIFIER | TAI 2 |

Table 4 shows an example of the base-station information database 312 of the base station C 101-3.

The base-station information database 312 of the base station C 101-3 stores the latitude/longitude: 35. 40/139. 57, the base station identifier: Global eNB ID C, and the tracking area identifier: TAI 2.

TABLE 5

BASE-STATION INFORMATION DATABASE OF BASE STATION D

| | |
|---|---|
| LATITUDE/LONGITUDE | LATITUDE: 35.40, LONGITUDE: 139.59 |
| BASE STATION IDENTIFIER | GLOBAL eNB ID D |
| TRACKING AREA IDENTIFIER | TAI 2 |

Table 5 shows an example of the base-station information database 312 of the base station D 101-4.

The base-station information database 312 of the base station D 101-4 stores the latitude/longitude: 35. 40/139. 59, the base station identifier: Global eNB ID D, and the tracking area identifier: TAI 2.

TABLE 6

BASE-STATION INFORMATION DATABASE OF BASE STATION E

| | |
|---|---|
| LATITUDE/LONGITUDE | LATITUDE: 35.42, LONGITUDE: 139.53 |
| BASE STATION IDENTIFIER | GLOBAL eNB ID E |
| TRACKING AREA IDENTIFIER | TAI 3 |

Table 6 shows an example of the base-station information database 312 of the base station E 101-5.

The base-station information databases 312 of the base station E 101-5 stores the latitude/longitude: 35. 42/139. 53, the base station identifier: Global eNB ID E, and the tracking area identifier: TAI 3.

TABLE 7

BASE-STATION INFORMATION DATABASE OF BASE STATION F

| | |
|---|---|
| LATITUDE/LONGITUDE | LATITUDE: 35.42, LONGITUDE: 139.55 |
| BASE STATION IDENTIFIER | GLOBAL eNB ID F |
| TRACKING AREA IDENTIFIER | TAI 3 |

Table 7 shows an example of the base-station information database 312 of the base station F 101-6.

The base-station information database 312 of the base station F 101-6 stores the latitude/longitude: 35. 42/139. 55, the base station identifier: Global eNB ID F, and the tracking area identifier: TAI 3.

TABLE 8

BASE-STATION INFORMATION DATABASE OF BASE STATION G

| | |
|---|---|
| LATITUDE/LONGITUDE | LATITUDE: 35.42, LONGITUDE: 139.57 |
| BASE STATION IDENTIFIER | GLOBAL eNB ID G |
| TRACKING AREA IDENTIFIER | TAI 4 |

Table 8 shows an example of the base-station information database 312 of the base station G 101-7.

The base-station information database 312 of the base station G 101-7 stores the latitude/longitude: 35. 42/139. 57, the base station identifier: Global eNB ID G, and the tracking area identifier: TAI 4.

TABLE 9

BASE-STATION INFORMATION DATABASE OF BASE STATION H

| | |
|---|---|
| LATITUDE/LONGITUDE | LATITUDE: 35.42, LONGITUDE: 139.59 |
| BASE STATION IDENTIFIER | GLOBAL eNB ID H |
| TRACKING AREA IDENTIFIER | TAI 4 |

Table 9 shows an example of the base-station information database 312 of the base station H 101-8.

The base-station information database 312 of the base station H 101-8 stores the latitude/longitude: 35. 42/139. 59, the base station identifier: Global eNB ID H, and the tracking area identifier: TAI 4.

TABLE 10

LOCATION REGISTRATION INFORMATION DATABASE OF CALL-PROCESSING CONTROL APPARATUS

| | |
|---|---|
| TAI LIST | TAI 1, TAI 2 |
| eNB OF LAST TAU | NULL |
| eNB OF SECOND LAST TAU | NULL |

Table 10 shows an example of the location registration information database 412 of the call-processing control apparatus 102.

The call-processing control apparatus 102 stores, for each mobile unit 100, the TAI list, and the identifiers of the last base station and the N-th base station from the last among ones to which the mobile unit 100 performed the location registration. Table 10 shows, as the example, the location registration information database 412 for the mobile unit 100 of the call-processing control apparatus 102, which stores the TAI list: TAI 1 and TAI 2, eNB of last TAU: NULL, and eNB of second last TAU: NULL.

TABLE 11

BASE-STATION INFORMATION DATABASE OF CALL-PROCESSING CONTROL APPARATUS

| BASE STATION A | LATITUDE/LONGITUDE | LATITUDE: 35.40, LONGITUDE: 139.53 |
|---|---|---|
| | BASE STATION IDENTIFIER | GLOBAL eNB ID A |
| | TRACKING AREA IDENTIFIER | TAI 1 |
| BASE STATION B | LATITUDE/LONGITUDE | LATITUDE: 35.40, LONGITUDE: 139.55 |
| | BASE STATION IDENTIFIER | GLOBAL eNB ID B |
| | TRACKING AREA IDENTIFIER | TAI 1 |
| BASE STATION C | LATITUDE/LONGITUDE | LATITUDE: 35.40, LONGITUDE: 139.57 |
| | BASE STATION IDENTIFIER | GLOBAL ENB ID C |
| | TRACKING AREA IDENTIFIER | TAI 2 |
| BASE STATION D | LATITUDE/LONGITUDE | LATITUDE: 35.40, LONGITUDE: 139.59 |
| | BASE STATION IDENTIFIER | GLOBAL eNB ID D |
| | TRACKING AREA IDENTIFIER | TAI 2 |
| BASE STATION E | LATITUDE/LONGITUDE | LATITUDE: 35.42, LONGITUDE: 139.53 |
| | BASE STATION IDENTIFIER | GLOBAL eNB ID E |
| | TRACKING AREA IDENTIFIER | TAI 3 |
| BASE STATION F | LATITUDE/LONGITUDE | LATITUDE: 35.42, LONGITUDE: 139.55 |
| | BASE STATION IDENTIFIER | GLOBAL eNB ID F |
| | TRACKING AREA IDENTIFIER | TAI 3 |
| BASE STATION G | LATITUDE/LONGITUDE | LATITUDE: 35.42, LONGITUDE: 139.57 |
| | BASE STATION IDENTIFIER | GLOBAL eNB ID G |
| | TRACKING AREA IDENTIFIER | TAI 4 |
| BASE STATION H | LATITUDE/LONGITUDE | LATITUDE: 35.42, LONGITUDE: 139.59 |
| | BASE STATION IDENTIFIER | GLOBAL eNB ID H |
| | TRACKING AREA IDENTIFIER | TAI 4 |

Table 11 shows an example of the base-station information database 413 of the call-processing control apparatus 102.

The base-station information database 413 of the call-processing control apparatus 102 stores the latitudes/longitudes, base station identifiers, and tracking area identifiers acquired from the base stations A 101-1, B 101-2, C 101-3, D 101-4, E 101-5, F 101-6, G 101-7, and H 101-8.

TABLE 12

PAGING INFORMATION DATABASE OF CALL-PROCESSING CONTROL APPARATUS

| MAXIMUM CANDIDATE NUMBER K FOR DISTANCE-BASED PAGING AREA | 1 |
|---|---|
| NUMBER OF PERIODIC-TIMER LOCATION REGISTRATION N | 2 |

Table 12 shows an example of the paging information database 415 of the call-processing control apparatus 102.

The paging information database 415 of the call-processing control apparatus 102 stores "1" as the maximum candidate number K for the distance-based paging area, and "2" as the number of periodic-timer location registration N necessary for calculating the inter-base-stations distance. When the maximum candidate number K for the distance-based paging area is "1", there is only one distance-based paging areas constructed by the call-processing control apparatus 102. When the number of periodic-timer location registration N is "2", the call-processing control apparatus 102 calculates, as the inter-base-stations distance, the distance from the last base station to the second base station from the last among ones to which the mobile unit performed the location registration.

Now, getting back to FIG. 5, the mobile unit 100 exists within the cell of the base station A 101-1 in a standby mode (step 501). The mobile unit 100 starts the periodic timer when it is in the standby mode (step 502). Then, when the periodic timer that the mobile unit 100 has started expires (step 503), the mobile unit 100 transmits a periodic-timer location registration message to the call-processing control apparatus 102 via the base station A 101-1 (step 504). When receiving the periodic-timer location registration message from the mobile unit 100, the call-processing control apparatus 102 sets Global eNB ID A in eNB of last TAU as the identifier for indicating the base station A 101-1 (step 506).

TABLE 13

LOCATION REGISTRATION INFORMATION DATABASE OF CALL-PROCESSING CONTROL APPARATUS

| TAI LIST | TAI 1, TAI 2 |
|---|---|
| eNB OF LAST TAU | GLOBAL eNB ID A |
| eNB OF SECOND LAST TAU | NULL |

Table 13 shows an example of the location registration information database 412 of the call-processing control apparatus 102 after the step 506 of FIG. 5.

The call-processing control apparatus 102 sets Global eNB ID A in eNB of last TAU in the location registration information database 412 of the call-processing control apparatus 102.

The call-processing control apparatus 102 transmits a response message to the periodic-timer location registration message via the base station A 101-1 to the mobile unit 100 (step 507). After receiving the response message to the periodic-timer location registration message, the mobile unit 100 transitions from a communication mode (step 505) to a standby mode (step 508), and then restarts the periodic timer again (step 509). The mobile unit 100 moves from the base station A 101-1 to the base station B 101-2 (step 510). Then, when the periodic timer of the mobile unit 100 expires (step 511), the mobile unit 100 transmits a periodic-timer location registration message within the cell under control of the base station B 101-2 (step 512). When receiving the periodic-timer location registration message from the mobile unit 100, the call-processing control apparatus 102 sets Global eNB ID B in eNB of last TAU as the identifier for indicating the base station B 101-2 (step 514), and sets Global eNB ID A in eNB of second last TAU as the identifier for indicating the base station A 101-1 (step 515).

TABLE 14

LOCATION REGISTRATION INFORMATION DATABASE OF CALL-PROCESSING CONTROL APPARATUS

| TAI LIST | TAI 1, TAI 2 |
|---|---|
| eNB OF LAST TAU | GLOBAL eNB ID B |
| eNB OF SECOND LAST TAU | GLOBAL eNB ID A |

Table 14 shows an example of the location registration information database 412 of the call-processing control apparatus 102 after the steps 514 and 515 of FIG. 5.

In the step 514 of FIG. 5, the call-processing control apparatus 102 sets Global eNB ID B in eNB of last TAU, and in the step 515 of FIG. 5, sets Global eNB ID A in eNB of second last TAU.

The call-processing control apparatus 102 transmits a response message to the periodic-timer location registration message via the base station B 101-2 to the mobile unit 100 (step 516). After receiving the response message to the periodic-timer location registration message, the mobile unit 100 transitions from a communication mode (step 513) to a standby mode (step 517), and then restarts the periodic timer (step 518). When having stored the base station identifiers in eNB of last TAU and eNB of second last TAU of its own location registration information database 412, the call-processing control apparatus 102 calculates a inter-base-stations distance X between eNB of last TAU and eNB of second last TAU (step 519). Then, the call-processing control apparatus 102 stores the calculated inter-base-stations distance X in the inter-base-stations distance database 414 of the call-processing control apparatus 102 (step 520). Moreover, after having repeated the operations from the steps 512 to 520, the call-processing control apparatus 102 accumulates data on the inter-base-stations distance X in the inter-base-stations distance database 414 (step 521). A statistical processing is applied to the accumulated statistical data on the inter-base-stations distance X in the inter-base-stations distance database 414 of the call-processing control apparatus 102 (step 522).

TABLE 15

INTER-BASE-STATIONS DISTANCE DATABASE OF CALL-PROCESSING CONTROL APPARATUS

| | |
|---|---|
| MAXIMUM | $X_{max}$ |
| | X1 |
| | X2 |
| | ... |
| MINIMUM | $X_{min}$ |
| RADIUS AT TIME OF CUMULATIVE PROBABILITY P' (= 0.7) | $X_{paging\_radius}$ |

Table 15 shows an example of the statistical data on the inter-base-stations distance X from the last base station 101 to the second base station 101 from the last among ones which the mobile unit performed the location registration, in the inter-base-stations distance database 414 of the call-processing control apparatus 102.

The call-processing control apparatus 102 has the statistical data on the inter-base-stations distance X for each mobile unit. Table 15 shows an example of the statistical data on the inter-base-stations distance X of a mobile unit 100 which the call-processing control apparatus 102 has.

The inter-base-stations distance database 414 of the call-processing control apparatus 102 stores the inter-base-stations distance X from $X_{max}$ to $X_{min}$. With respect to the continuous inter-base-stations distance X from $X_{max}$ to $X_{min}$, the call-processing control apparatus 102 calculates the inter-base-stations distance X which the mobile unit 100 moves until the periodic timer expires, and derives f(x) representing a probability density function of the inter-base-stations distance X which the mobile unit 100 moves. The call-processing control apparatus 102 determines in advance a threshold value for cumulative probability of the probability density function f(x). Then, when the cumulative probability from the time when the inter-base-stations distance X is equal to "0" to the time when X is equal to $X_{paging\_radius}$ has exceeded the threshold value, the call-processing control apparatus 102 determines $X_{paging\_radius}$ as the radius of the distance-based paging area. In the present embodiment, the threshold value for the cumulative probability is set at "0.7".

Figure 6A:
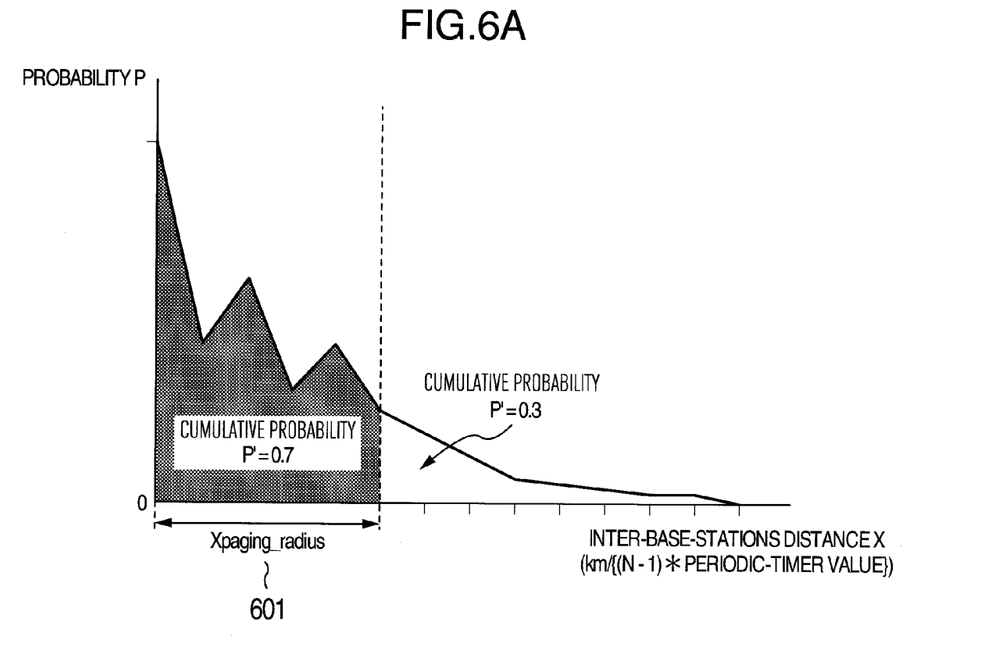
FIG. 6A illustrates the statistical processing contents for determining the inter-base-stations distance in an embodiment of the present invention.
Figure 6B:
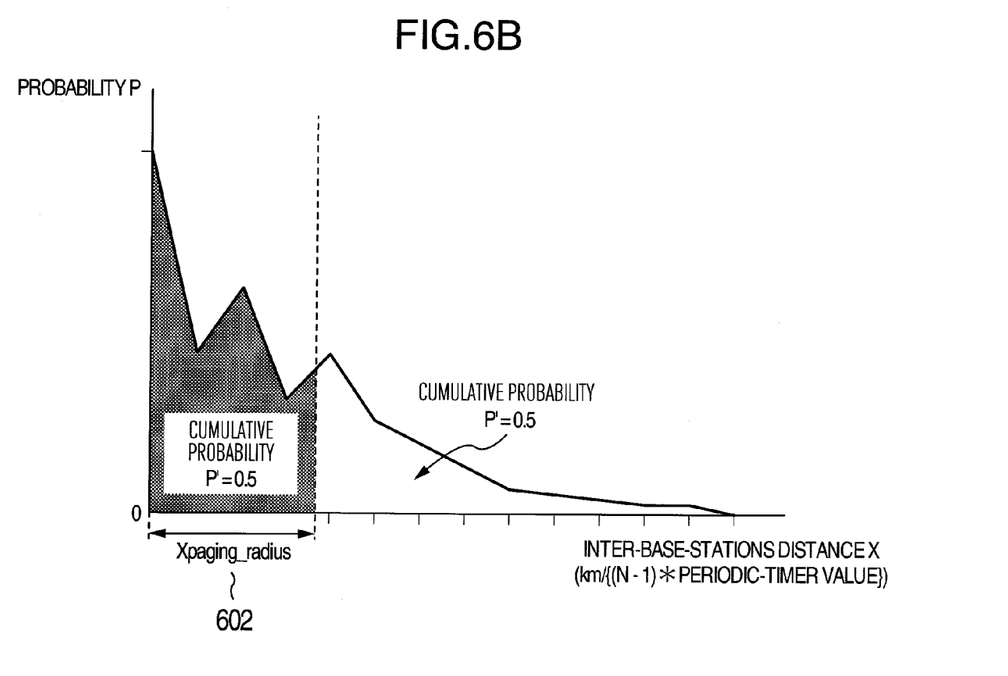
FIG. 6B illustrates the statistical processing contents for determining the inter-base-stations distance in an embodiment of the present invention.

FIGS. 6A and 6B illustrate the statistical processing contents for determining the inter-base-stations distance X in an embodiment of the present invention.

FIG. 6A illustrates $X_{paging\_radius}$ 601 at the time when the cumulative probability of the probability density function f(x) from the time when the inter-base-stations distance X is "0" to the time when X is $X_{paging\_radius}$ 601 becomes equal to "0.7", while FIG. 6B illustrates $X_{paging\_radius}$ 601 at the time when the cumulative probability from the time when the inter-base-stations distance X is "0" to the time when X is $X_{paging\_radius}$ 601 becomes equal to "0.5". The horizontal axis of the inter-base-stations distance X in FIGS. 6A and 6B indicates the distance which the mobile unit 100 has moved during (N−1)*(periodic-timer value). In the present embodiment, because of N=2 as shown in Table 12, the horizontal axis of the inter-base-stations distance X in FIGS. 6A and 6B is the distance which the mobile unit 100 has moved when the periodic-timer value expires at one time. The vertical axis of f(x) in FIGS. 6A and 6B indicates a probability density function of the inter-base-stations distance X. The call-processing control apparatus 102 determines in advance a threshold value for the cumulative probability of the probability density function f(x). Then, when the cumulative probability from the time when the inter-base-stations distance X is "0" to the time when X is $X_{paging\_radius}$ 601 has exceeded the threshold value, the call-processing control apparatus 102 determines $X_{paging\_radius}$ 601 as the radius of the distance-based paging area. In Table 15, the threshold value for the cumulative probability has been set at "0.7".

Figure 7A:
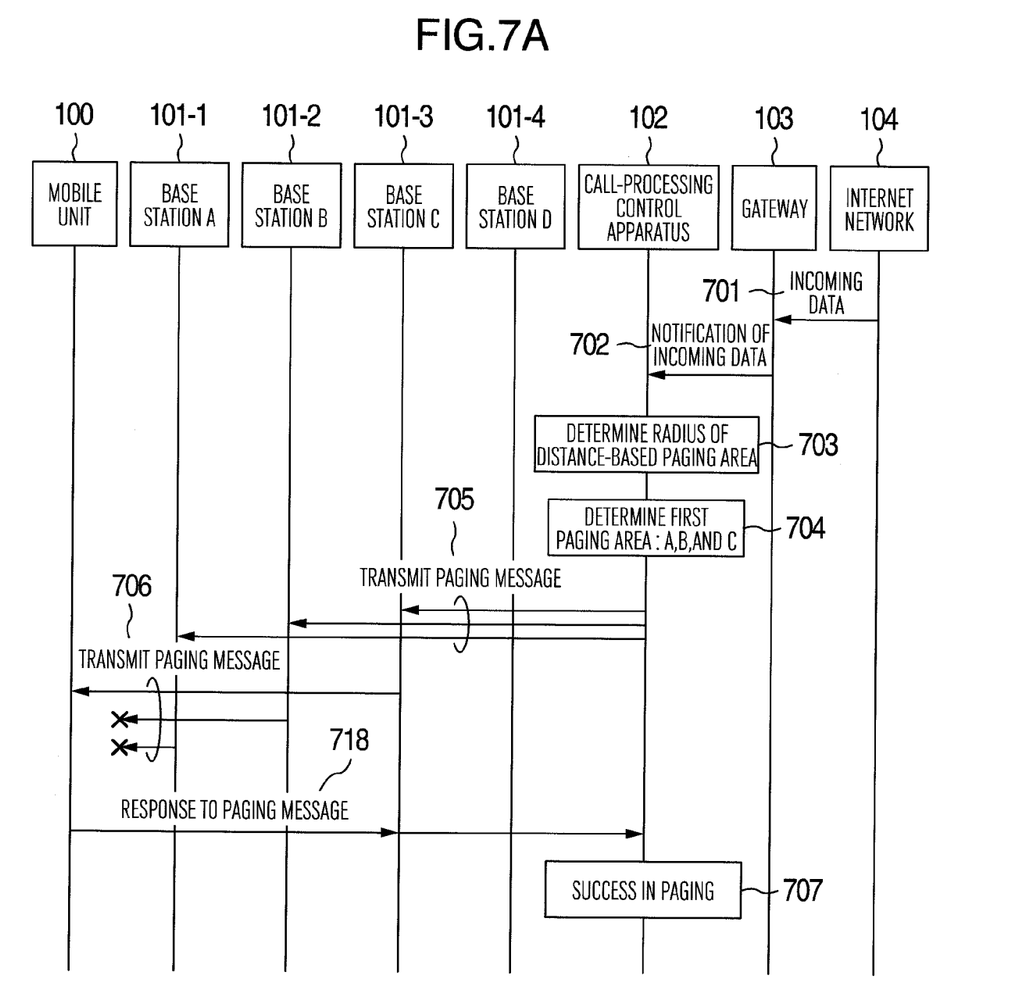
FIG. 7A is a sequence diagram for illustrating the paging processing (K=1) in the case where incoming data for a mobile unit 100 has occurred.

FIG. 7A is a sequence diagram for illustrating the paging processing (K=1) in the case where incoming data for the mobile unit 100 has occurred.

FIG. 7A shows a case example of the paging performed when receiving an incoming data for the mobile unit 100 from the Internet network 104.

When receiving an incoming data from the Internet network 104, the gateway 103 notifies the call-processing control apparatus 102 of the incoming data (steps 701 and 702). Then, the call-processing control apparatus 102 determines $X_{paging\_radius}$ 601 which becomes the radius of the distance-based paging area 106, based on the inter-base-stations distance database 414 of the call-processing control apparatus 102 shown in Table 15 (steps 703). Next, the call-processing control apparatus 102 selects the base stations 101 within the radius of $X_{paging\_radius}$ 601 based on the latitude/longitude information on the base stations 101 in the base-station information database 413 of the call-processing control apparatus 102. The call-processing control apparatus 102 selects the base stations 101 within the tracking-area-based paging area 107 (TAI 1 and TAI 2 area in TAI list) based on the location registration information database 412 of the call-processing control apparatus 102. The call-processing control apparatus 102 determines that the base stations 101 within the first paging area are the base stations A 101-1, B 101-2, and C 101-3 which are included both within the distance-based paging area 106 and within the tracking-area-based paging area 107 (step 704). Then, the call-processing control apparatus 102 transmits a paging message to the base stations A 101-1, B 101-2, and C 101-3 (step 705). When receiving the paging message from the call-processing control apparatus 102, the base stations A 101-1, B 101-2, and C 101-3 transmit the paging message within the cells under their control to notify the mobile unit 100 of receiving the incoming data (step 706). When the mobile unit 100 transmits a response to the paging message via the base station C 101-3 (step 718), the call-processing control apparatus 102 detects the response and determines the success of the paging (step 707).

Figure 8A:
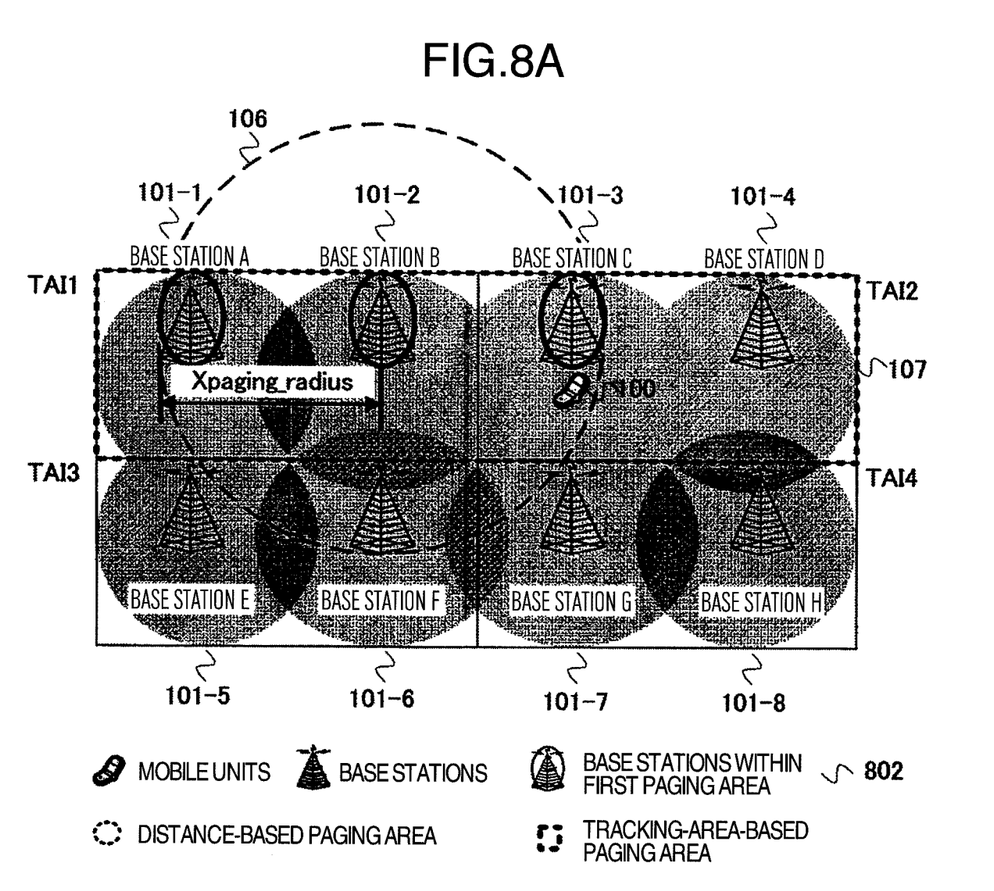
FIG. 8A shows the distance-based paging area in the paging process (K=1).

FIG. 8A shows the distance-based paging area in the paging process (K=1).

FIG. 8A shows the first paging area determined in response to the periodic-timer location registration 105 performed by the mobile unit 100. The base stations 101 within the tracking-area-based paging area 107 are the base stations A 101-1, B 101-2, C 101-3, and D 101-4, and the base stations 101 within the distance-based paging area 106 are the base stations A 101-1, B 101-2, C 101-3, and F 101-6. Accordingly, the call-processing control apparatus 102 determines that the base stations within the first paging area 802 are the base stations A 101-1, B 101-2, and C 101-3 which are included both within the tracking-area-based paging area 107 and within the distance-based paging area 106. The call-processing control apparatus 102 transmits the paging message to the base stations within the first paging area 802. Only in the case of failing in the paging via the base stations within the first paging area 802, the call-processing control apparatus 102 performs the paging within the tracking-area-based paging area 107.

In the present embodiment, the call-processing control apparatus 102 performs the paging by taking advantage of the distance-based paging area 106 smaller than the tracking-area-based paging area 107, and determines the radius of the distance-based paging area 106 based on the inter-base-stations distance which the mobile unit 100 moves within a constant periodic time interval. This feature makes it possible to judge the paging area including the cells where the mobile unit 100 may exist more accurately as compared with the conventional schemes and to suppress the consumption amount of the wireless resources due to the paging.

The present embodiment uses, in order to calculate the inter-base-stations distance X, the N (N=2)-th base station 101 from the last among ones which received the location registration message. It is also allowable, however, that, in the case where N is three or more, the data on the inter-base-stations distance X may be stored in the inter-base-stations distance database 414 of the call-processing control apparatus 102.

In Table 15, the threshold value for the cumulative probability of the probability density function f (x) from the inter-base-stations distance X="0" to X=$X_{paging\_radius}$ 601 is set at "0.7", but the value of $X_{paging\_radius}$ 601 may also be derived by taking advantage of a threshold value other than "0.7".

In the present embodiment, the step-by-step paging allowance number K, which is indicated in the paging information database 415 of the call-processing control apparatus 102 is set at "1", but the step-by-step paging may also be performed in plural number of times by setting K at two or more. The step-by-step paging in the plural number of times can be performed by setting the plural threshold values for the cumulative probability of the probability density function f (x). For example, as shown in FIGS. 6A and 6B, these plural number of threshold values for the cumulative probability of the probability density function f (x) may also be set at "0.5" and "0.7". If two $X_{paging\_radius}$ 601 in this case are represented as $X_{p\_0.5}$ and $X_{p\_0.7}$, respectively, the cumulative probability from the inter-base-stations distance X="0" to X=$X_{p\_0.5}$ becomes equal to "0.5", and the cumulative probability from X="0" to X=$X_{p\_0.7}$ becomes equal to "0.7". Accordingly, it is determined that the base stations within the first paging area 802 are ones which are included both within the distance-based paging area 106 whose radius is equal to $X_{p\_0.5}$ and within the tracking-area-based paging area 107, and that the base stations within the second paging area are ones which are included both within the distance-based paging area 106 whose radius is equal to $X_{p\_0.7}$ and within the tracking-area-based paging area 107.

Figure 7B:
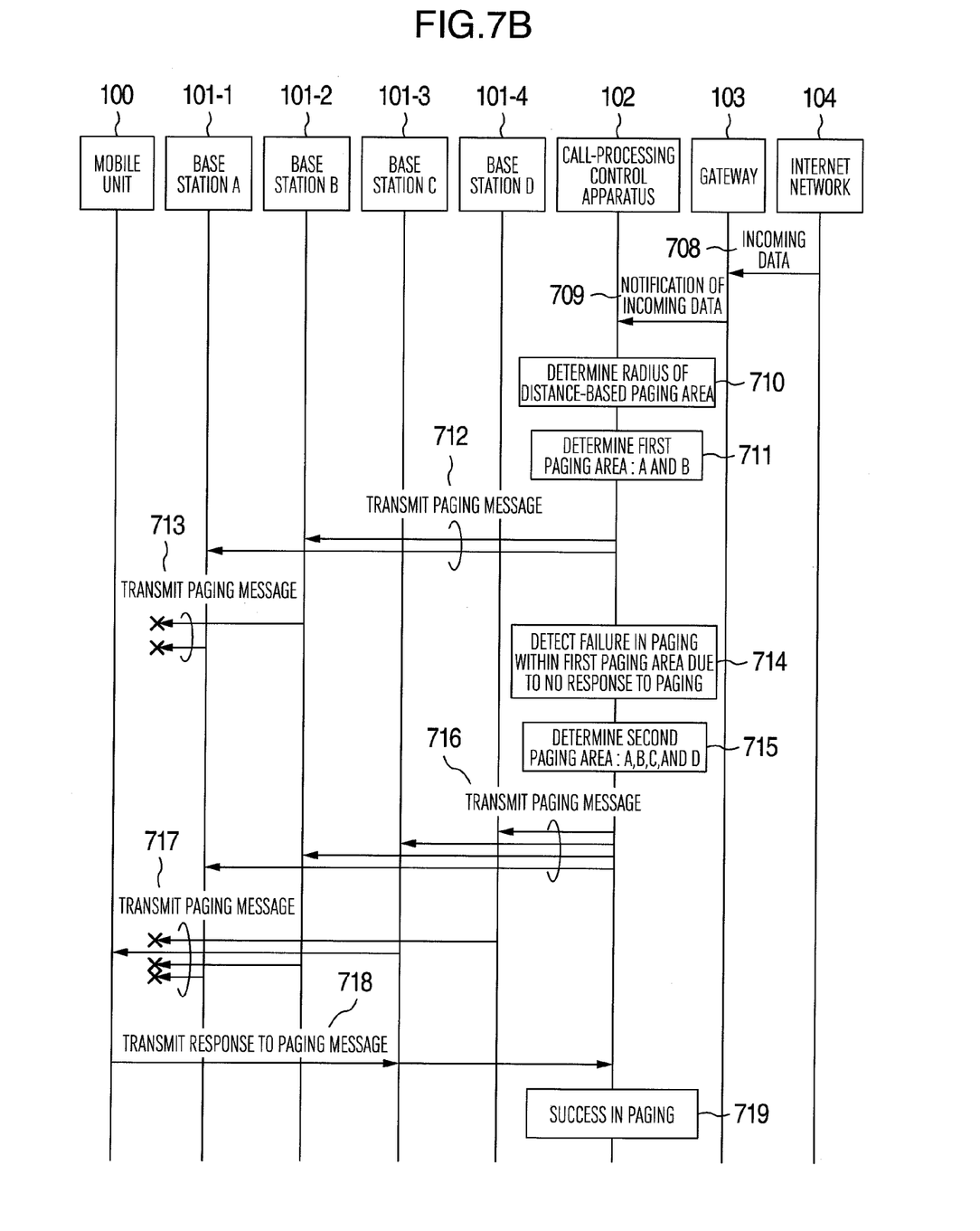
FIG. 7B is a sequence diagram for illustrating the step-by-step paging processing steps (K=2) in the case where incoming data for a mobile unit 100 has occurred.

FIG. 7B is a sequence diagram for illustrating the step-by-step paging processing (K=2), where a sequence of transmitting the paging message to the base stations within the second paging area in the case of failing in the paging via the base stations within the first paging area 802 is added to the paging processing (K=1) in FIG. 7A.

When receiving an incoming data from the Internet network 104, the gateway 103 notifies the call-processing control apparatus 102 of the incoming data (steps 708 and 709). Then, the call-processing control apparatus 102 determines two $X_{paging\_radius}$ 601, $X_{p\_0.5}$ and $X_{p\_0.7}$, based on the inter-base-stations distance database 414 of the call-processing control apparatus 102 (steps 710). Next, the call-processing control apparatus 102 selects the base stations 101 within the radius of $X_{p\_0.5}$ and within the radius of $X_{p\_0.7}$ based on the latitude/longitude information on the base stations 101 in the base-station information database 413 of the call-processing control apparatus 102. The call-processing control apparatus 102 selects the base stations 101 within the tracking-area-based paging area 107 (TAI 1 and TAI 2 area in TAI list) based on the location registration information database 412 of the call-processing control apparatus 102. The call-processing control apparatus 102 determines that the base stations 101 within the first paging area 802 are the base stations A 101-1 and B 101-2 (step 711). Then, the call-processing control apparatus 102 transmits a paging message to the base stations A 101-1 and B 101-2 (step 712). When receiving the paging message from the call-processing control apparatus 102, the base stations A 101-1 and B 101-2 transmit the paging message within the cells under their control to notify the mobile unit 100 of receiving the incoming data (step 713). When no mobile unit transmits a response to the paging message, the call-processing control apparatus 102 detects the failure in the paging via the base stations within the first paging area 802 (step 714), and determines that the base stations 101 within the second paging area are the base stations A 101-1, B 101-2, C 101-3, and D 101-4 (step 715). Then, the call-processing control apparatus 102 transmits a paging message to the base stations A 101-1, B 101-2, C 101-3, and D 101-4 (step 716). When receiving the paging message from the call-processing control apparatus 102, the base stations A 101-1, B 101-2, C 101-3, and D 101-4 transmit the paging message within the cells under their control to notify the mobile unit 100 of receiving the incoming data (step 717). When the mobile unit 100 transmits a response to the paging message via the base station C 101-3, the call-processing control apparatus 102 detects the response and determines the success in the paging (step 719).

Figure 8B:
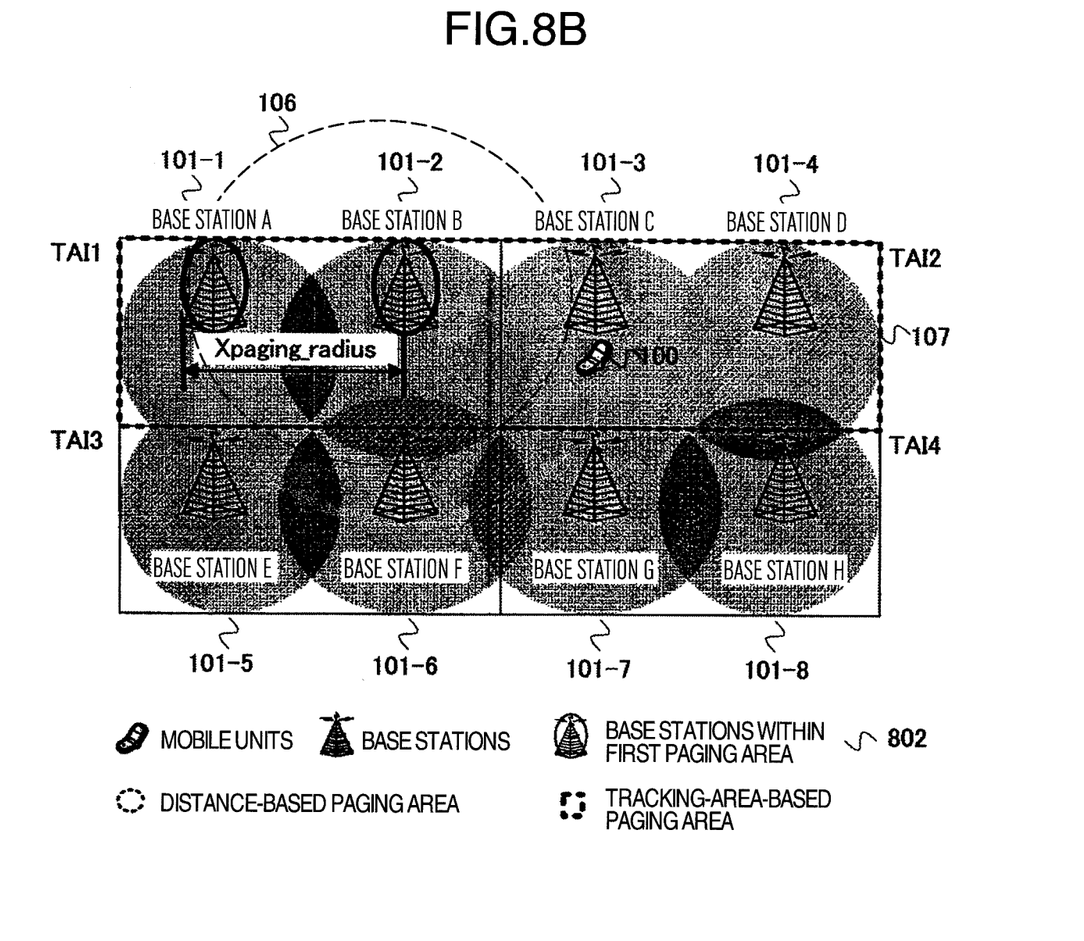
FIG. 8B shows the distance-based paging area in the step-by-step paging processing (K=2).

FIG. 8B shows the first paging area determined in response to the periodic-timer location registration 105 performed by the mobile unit 100 in the step-by-step paging processing (K=2). The base stations 101 within the tracking-area-based paging area 107 are the base stations A 101-1, B 101-2, C 101-3, and D 101-4, and the base stations 101 within the distance-based paging area 106 whose radius is equal to $X_{p\_0.5}$ are the base stations A 101-1 and B 101-2. Accordingly, the call-processing control apparatus 102 determines that the base stations within the first paging area 802 are the base stations A 101-1 and B 101-2 which are included both within the tracking-area-based paging area 107 and within the distance-based paging area 106.

In the present embodiment, the call-processing control apparatus 102 holds the latitudes/longitudes of the base stations 101 to calculate the inter-base-stations distance. It is also allowable, however, that the call-processing control apparatus 102 holds the latitudes/longitudes of central values of the cells to calculate the inter-cells distance. This configuration also makes it possible to calculate the radius of the distance-based paging area 106 as with the present embodiment.

The call-processing control apparatus 102 uses location registration processing performed by the mobile unit 100 to predict the distance which the mobile unit 100 moves within a constant periodic time interval. This feature allows execution of the effective paging processing.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A mobile communication system comprising a plurality of mobile units, a plurality of base stations, and a call-processing control apparatus for controlling a call-processing by corresponding the plurality of mobile units to the plurality of base stations in response to location registration performed by the plurality of mobile units via the plurality of base stations, the location registration and paging for each of the plurality of mobile units in the mobile communication system being performed based on a tracking area including cells of the plurality of base stations, and each mobile unit having a function to perform periodic timer location registration in the tracking area; wherein the call-processing control apparatus is configured to:

calculate statistical data on an inter-base-stations distance for each of the plurality of mobile units from a last base station to a N-th (N is an integer of one or more) base station from among ones which the mobile unit performed the location registration last, based on tracking area information and periodic timer location registration information, and determine a radius of a distance-based paging area based on the calculated statistical data on the inter-base-stations distance, to perform the paging via the plurality of base stations included within the distance-based paging area and within a tracking-area-based paging area, wherein the call-processing control apparatus is configured to:

calculate an inter-base-stations distance X which each mobile unit moved between the last location registration and the N-th location registration from the last, and a probability density function f (x) of the inter-base-stations distance X, and by setting plural threshold values for a cumulative probability of the probability density function f (x), calculate plural values of the statistical data on the inter-base-stations distance, page each of the plurality of mobile units via the plurality of base stations both within the area whose radius is equal to a smallest value of the statistical data and within the tracking area, and, in case of failing in the paging, enlarge the paging area in a step-by-step manner by similarly performing the paging within the area whose radius is equal to a next value among plural values of the statistical data in ascending order.

2. A paging-area determination method effected in a mobile communication system comprising a plurality of mobile units, a plurality of base stations, and a call-processing control apparatus for controlling a call-processing by corresponding the plurality of mobile units to the plurality of base stations in response to location registration performed by the plurality of mobile units via the plurality of base stations, the location registration and paging for each of the plurality of mobile units in the mobile communication system being performed based on a tracking area including cells of the plurality of base stations, and each mobile unit having a function to perform periodic timer location registration in the tracking area, wherein the method comprises:

calculating statistical data on an inter-base-stations distance for each of the plurality of mobile units from a last base station to a N-th (N is an integer of one or more) base station from among ones which the mobile unit performed the location registration last, based on tracking area information and periodic timer location registration information, and determining a radius of a distance-based paging area based on the calculated statistical data on the inter-base-stations distance, to perform the paging via the plurality of base stations included within the distance-based paging area and within a tracking-area-based paging area:

further comprises:

calculating an inter-base-stations distance X which each mobile unit moved between the last location registration and the N-th location registration from the last, and a probability density function f (x) of the inter-base-stations distance X, and by setting plural threshold values for a cumulative probability of the probability density function f (x), calculating plural values of the statistical data on the inter-base-stations distance, paging each of the plurality of mobile unit via the plurality of base stations both within the area whose radius is equal to a smallest value of the statistical data and within the tracking area, and, in case of failing in the paging, enlarging the paging area in a step-by-step manner by similarly performing the paging within the area whose radius is equal to a next value among plural values of the statistical data in ascending order.

3. A call-processing control apparatus for controlling a call-processing by corresponding a plurality of mobile units to a plurality of the base stations in response to location registration performed by the mobile units via the plurality of base stations in a mobile communication system comprising said plurality of mobile units and said plurality of base stations, the location registration and paging for each of the plurality of mobile units in the mobile communication system being performed based on a tracking area including cells of the plurality of base stations, and each mobile unit having a function to perform periodic timer location registration in the tracking area; wherein the call-processing control apparatus is configured to:

calculate statistical data on an inter-base-stations distance for each of the plurality of mobile units from a last base station to a N-th (N is an integer of one or more) base station from among ones which the mobile unit performed the location registration last, based on the tracking area information and the periodic timer location registration information, and determine a radius of a distance-based paging area based on the calculated statistical data on the inter-base-stations distance, to perform the paging via the plurality of base stations included within the distance-based paging area and within a tracking-area-based paging area, wherein the call-processing control apparatus is configured to:

calculate an inter-base-stations distance X which each mobile unit moved between the last location registration and the N-th location registration from the last, and a probability density function f (x) of the inter-base-stations distance X, and by setting plural threshold values for a cumulative probability of the probability density function f (x), calculate plural values of the statistical data on the inter-base-stations distance, page each of the plurality of mobile units via the plurality of base stations both within the area whose radius is equal to a smallest value of the statistical data and within the tracking area, and, in case of failing in the paging, enlarge the paging area in a step-by-step manner by similarly performing the paging within the area whose radius is equal to a next value among plural values of the statistical data in ascending order.

* * * * *